Dec. 1, 1953

N. G. MALONEY 2,661,091

APPARATUS FOR WEIGHT CLASSIFICATION

Filed Jan. 24, 1951

INVENTOR.
Norvin G. Maloney
BY
Harry J. McCauley
ATTORNEY.

Dec. 1, 1953

N. G. MALONEY 2,661,091

APPARATUS FOR WEIGHT CLASSIFICATION

Filed Jan. 24, 1951

INVENTOR.
Norvin G. Maloney
BY
Harry J. McCauley
ATTORNEY.

Dec. 1, 1953  N. G. MALONEY  2,661,091
APPARATUS FOR WEIGHT CLASSIFICATION
Filed Jan. 24, 1951  4 Sheets-Sheet 3

INVENTOR.
Norvin G. Maloney
BY Harry J. McCauley
ATTORNEY

UNITED STATES PATENT OFFICE 2,661,091

APPARATUS FOR WEIGHT CLASSIFICATION

Norvin G. Maloney, Newport, Del., assignor to E. I. du Pont de Nemours & Company, Wilmington, Del., a corporation of Delaware Application January 24, 1951, Serial No. 207,636

10 Claims. (Cl. 209—121)

This invention relates to an improved apparatus for weight classification, and particularly to apparatus for the weight classification of a succession of articles moving at relatively high speeds.

Technological development in the field of packaging and filling materials into containers has provided industry with high speed equipment of very high capacity output. The use of such equipment introduces a serious problem, in that presently available inspection equipment for the determination of underweight or overweight conditions is not adapted to operation at speeds matching those obtained by the packaging and filling machinery. Weighing comparison of packaged products against a standard mass as now practised involves balancing one mass against another by the use of a scale beam or its equivalent and, after the system has reached equilibrium, determining the direction and sometimes the degree of deviation existing. Such comparison requires movement of an indicating element to a position at or near rest, which may involve a succession of cyclical swings past an equilibrium line, or at least an approach to equilibrium, followed by damping, to permit near attainment of the equilibrium state before an accurate comparison of the standard and the product is possible. With such systems an appreciable interval of time is required to make each weight comparison and the processing rate is therefore relatively low.

A special system of weight classification applicable to cylindrically shaped objects which are capable of rolling movement has been developed recently, but use is limited to articles of this particular shape and any deviations in form, such as indentations or upraised portions along the peripheries, introduce errors which, under high speed conditions especially, are of relatively large magnitude.

A principal object of this invention is to provide a rapid and accurate method and apparatus for the weight classification of a succession of articles moving at relatively high speeds. It is further intended to provide an apparatus for weight classification having a long operating life, automatic functioning, and a construction requiring little maintenance.

Other objects of this invention will become apparent from this description and the following drawings in which:

Figs. 1 and 1a are plan views in continuation of one embodiment of apparatus constructed according to this invention, Figs. 2 and 2a are side elevation views in continuation of the apparatus shown in Figs. 1 and 1a, Fig. 3 is a top plan view of several package-carrying pallets showing their relation to the conveyor chains.

Generally, the objects of this invention are attained by determining the relationship of a product mass to a standard mass by the rate of acceleration of a system balanced with respect to the standard mass, the determination being made while the product mass is being translated across the system at substantially uniform velocity, and effecting the comparison of the product mass with the standard mass within a very limited displacement range from the system's position of rest. As will become apparent from the following detailed description, the comparison of masses necessary to the weight classification of a succession of articles or packages according to this invention may be accomplished with a very high degree of accuracy during a very short interval of time, thus making it possible to process the articles or packages at output rates at least equal to the output rates of modern high-speed supplying equipment. In a typical case, a package filling machine might continuously deliver as many as 300 or more packages per minute of a nominal weight of three pounds each. The weight classification of such a high product flow to safeguard against under-filling or over-filling within the brief time interval of ⅕ second per unit constitutes a difficult problem. Necessarily, continuous operation at speeds of the order cited require the use of fully automatic equipment, and the design should preferably be such as to require a minimum of maintenance in order to conserve production time.

Referring to Figures 1, 1a, 2 and 2a, one embodiment of apparatus according to this invention may comprise an endless conveyor system adapted to translate a succession of articles continuously across a weighing platform, which is one element of a balanced system for the comparison of the masses of the individual articles with a standard mass. Additional apparatus is provided for cyclically locking and unlocking the weighing platform in co-ordination with the movement of articles across it, so that the system is restored to base position upon completion of the weighing of each article in turn. Finally, automatic detection equipment is provided for sensing the degree and direction of deviation of each article mass from the standard mass and for actuating classification devices adapted to segregate articles which are either under or over a prescribed acceptable weight.

Figure 1:
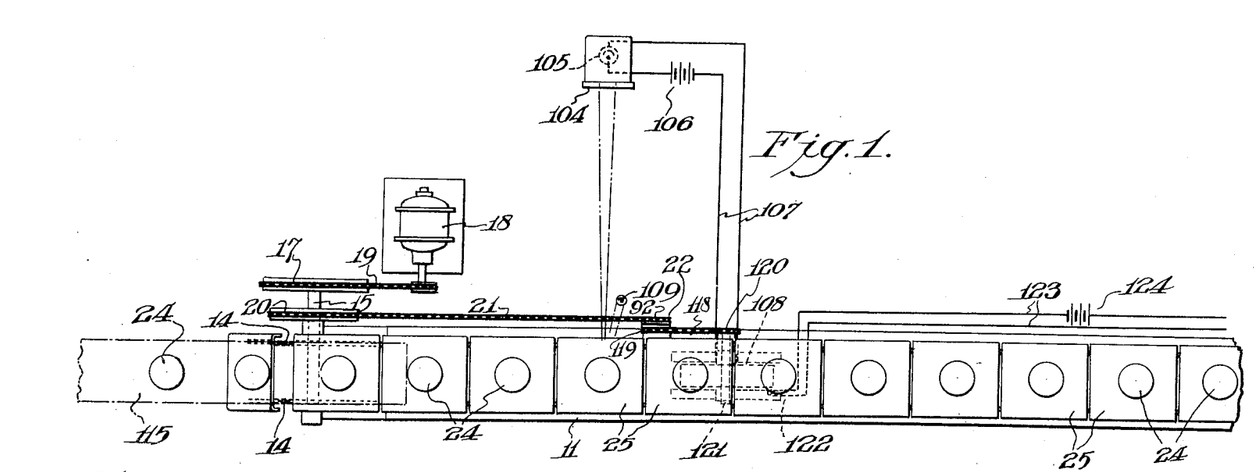

The conveyor system and the weighing apparatus co-operating therewith may be conveniently mounted upon a common frame 11. The conveyor shown may consist of two endless roller chains, indicated generally at 12, each chain being supported by suitable sprockets 14 and 14', adjacent pairs of which are keyed or otherwise secured to common shafts 15 and 15', respectively. Shafts 15 and 15' are journaled in support brackets 16 and 16', respectively, attached to frame 11. As shown in Fig. 1, shaft 15 is provided with sprocket 17 fixed thereto, and is driven from motor 18, which is preferably of the synchronous type, through drive chain 19. Sprocket 20, keyed to shaft 15, drives the weighing platform locking and unlocking mechanism, hereinafter described, through roller chain 21 engaging with sprocket 22 (refer Figs. 9 and 10). Positive driving means, such as that provided by roller chains and sprockets, are employed throughout because of the necessity of exactly co-ordinating the movement of the articles to be classified with the operation of the weighing mechanism.

Frame 11 is provided with a smooth, plane table surface 23 (Figs. 4, 7, 8 and 9) for the support of the articles 24, which are to be classified according to weight or, more desirably, for the support of pallets 25 carrying the articles, where pallets are employed for the intermediate support of the individual articles. A principal advantage inherent in the employment of pallets for the support of articles is that the surfaces which contact table 23 and the weighing platform 26 (Figs. 4, 5 and 9) may be maintained in essentially the same condition of smoothness, thereby eliminating variations in the coefficients of friction which might adversely affect the operation. Another important advantage is that vertical force components arising from surface irregularities in the articles themselves are entirely eliminated since the articles are not brought into direct contact with the weighing platform. A further advantage is that pallets may be provided with cradle supports conforming to the shapes of the articles being processed, so that articles having a wide variety of shapes may be accommodated by the provision of the proper shape of support in each case. It will be understood, however, that articles capable of taking a stable position while being slid along, such as cylindrical cans resting on their flat base portions, may be processed satisfactorily without the intermediate support of pallet elements. In the latter case, chains 12 may be provided with cross bars disposed so that they clear table 23, individual articles 24 being supplied to the apparatus in such a manner that one is disposed between each pair of cross bars, the rear cross bar of each pair, referred to the direction in which the chain is moved, propelling each article along.

In practice, it has been found that slight deformations in the exterior surfaces of the articles contacting the cross bars introduce errors in the weighing, due to the fact that non-compensable vertical force components are thereby applied to the weighing platform. The effect of such deformations can be minimized by providing the cross bars with freely rotatable ball bearing pusher elements which transmit the moving force to the articles. In a typical case wherein cylindrical cans were classified, a pair of ball bearing sets (S. A. E. light series #34) were pressed on to the cross bars a sufficient distance apart to permit locating a can therebetween, while still preventing direct contact of the can with the cross bar. The large diameter external convex surfaces of the outer race elements of the bearings provided a relatively small area of contact with each can and eliminated much of the interference occasioned by the usual small dents and irregularities encountered in can bodies.

Where the translation of the articles is effected by pallets which support the articles out of direct contact with the weighing platform, the pallets may be provided with rotatable wheels or rollers mounted on the lower sides to minimize the area of contact with the platform.

Figure 7:
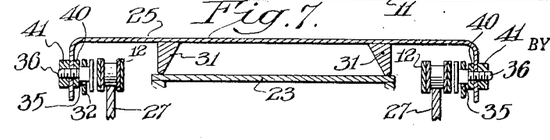
Fig. 7 is a sectional view taken along line 7—7 of Fig. 11.
Figure 8:
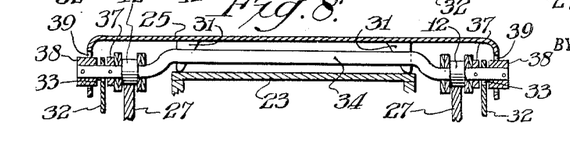
Fig. 8 is a sectional view taken along line 8—8 of Fig. 11.
Figure 11:
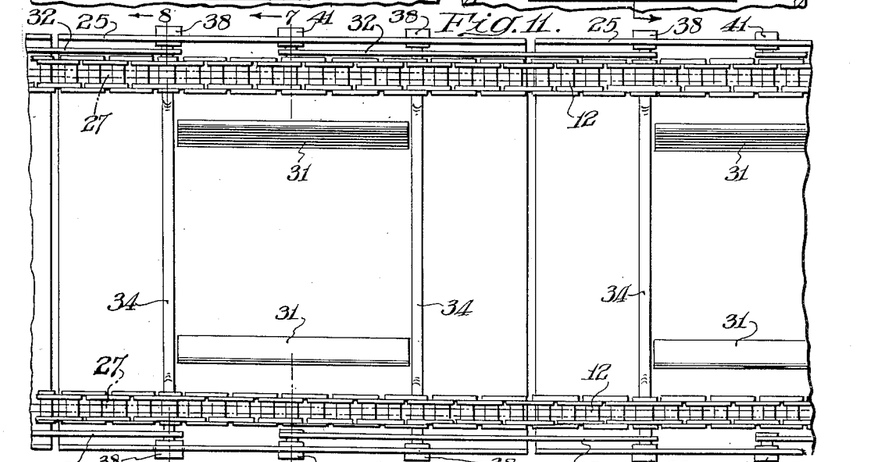
Fig. 11 is a view looking along line 11—11 of Fig. 2.

A preferred design of pallet suitable for use with this invention is illustrated in Figs. 3, 7, 8, 11 and 12. In this embodiment the pallets comprise flat metal plates 25 of sufficient thickness to support the weights of the articles in process without buckling or distortion. Plates 25 carry supporting shoes 31 securely attached to the undersides, which shoes are adapted to slide across the surfaces of table 23 and weighing platform 26 with a substantially constant low frictional drag. Shoes 31 may be fabricated from metal but preferably are constructed from a material such as polymeric tetrafluoroethylene, or the like, which possesses a characteristic slippery surface well suited to this particular use. To minimize wear of the contacting surfaces in relative movement, the apparatus may incorporate wipers and oil applicators of conventional design, and therefore not shown or described herein, for cleaning and lubricating shoes 31 during the lower portion of chain travel. As indicated in Figs. 8 and 11 particularly, the pallets may each carry two shoes of a length approximately one-half the length of the pallets, the shoes being disposed in the central portions of the pallets, referred to the length dimension, and about one-fourth in from the sides, referred to the width dimension. The inside edges of shoes 31 are preferably undercut so that a minimum area will contact table 23 while still preserving stability of the pallets as supporting structures. Shoes 31 are secured to the undersides of plates 25 with an appropriate adhesive, or by clips, screws or other conventional fastenings.

As shown in Figs. 2, 2a, 7, 8, 10, 11 and 12 particularly, pallets 25 are secured to endless roller chains 12, which continuously move the pallets with article-receiving surfaces upright over the upper portion of the machine and return the pallets with article-receiving surfaces inverted over the lower portion of the machine. Guide rails 27, integral with frame 11, support chains 12 in free rolling contact during the upper path of travel, the length of the individual rollers being sufficient to span the width of rails 27 without binding. No physical support for chains 12 other than that provided by sprockets 14 and 14' is required for the return circuit of chain travel.

Figure 12:
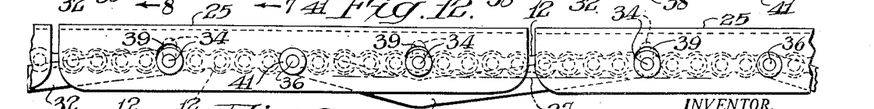
Fig. 12 is a side elevation view showing a preferred construction and arrangement of drag links connecting successive package-carrying pallets.
Figure 14:
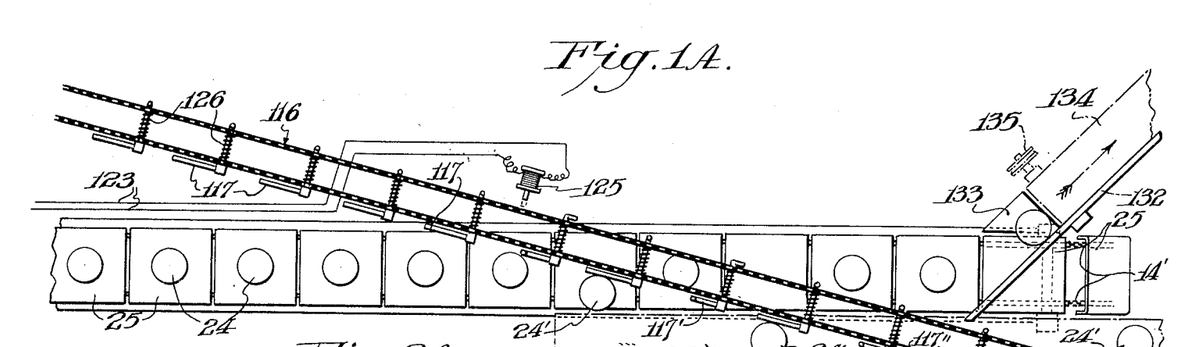
Figure 15:
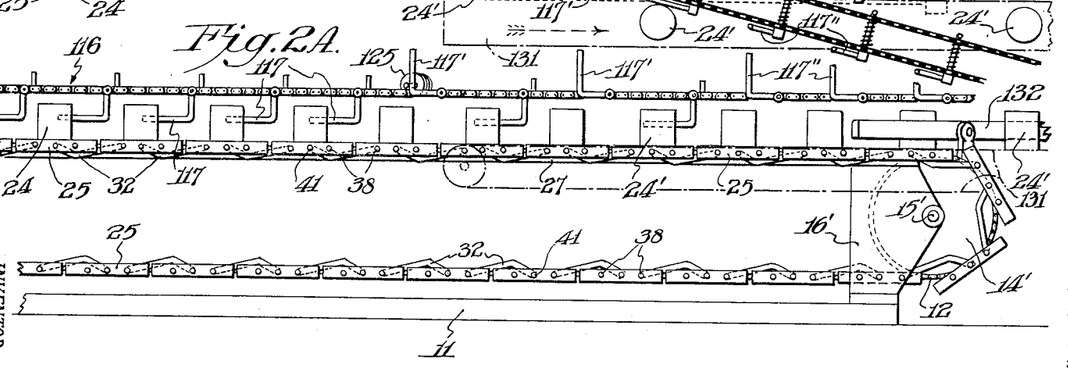

A preferred driving connection between pallets 25 and chains 12 is detailed in Figs. 8, 11 and 12. In this arrangement each individual pallet is drawn in the direction of chain travel by a drag link 32 connecting it with the preceding pallet, while a second drag link 32 connects each pallet with the one immediately succeeding it. Drag links 32 are formed in the shape shown so that at no point will they contact the undersides of pallets 25 as chains 12 track around sprockets 14 and 14'. In addition, the holes 33, receiving the ends of the driving cross pins 34, and the holes 35, receiving the inside ends of the pins 36 attached to pallets 25 (refer Fig. 7), are both made over-size, so that the pallets can freely accommodate their travel to changes in direction occurring during chain travel and, more important, so that the full weights of the pallets and their loads will always be transmitted to shoes 31 during the time the pallets are moved over the length of table 23. Sufficient lateral clearance is likewise provided at these points to eliminate any lateral binding between links 32 and adjacent surfaces.

Driving cross pins 34 (refer Fig. 8) are assembled with chains 12 by removing the standard chain roller pins and substituting pins 34. It will be noted that the horizontal central plane of chain travel coincides with the top of table 23, thus procuring the application of driving forces in this plane and eliminating any vertical force components which would introduce error into the weighing comparison. The central portions of pins 34 are offset, so that the pins clear table 23 and are retained in this position by small drive pins or wedge elements (not shown) locking them within the associated chain roller elements. The assembly is further strengthened by washers 37 pinned to the inside ends of elements 34, and links 32 are maintained in place by outside washers 38 pinned to the outer ends. The edges of pallets 25 are turned in a direction to enclose chains 12, for the purpose of protecting table 23 against the entrance of dust or other foreign material which might change the coefficient of friction existing between the table and shoes 31, over-size apertures 39 being provided to facilitate assembly of the several components with the chains.

As shown in Fig. 7, pins 36 securing the force-transmitting ends of links 32, comprise flange-headed bolts which are fixedly secured to pallets 25 by lock nuts 40 and 41, these pins having no direct connection with chains 12. Good stability in force transmission is obtained by disposing pins 36 at the mid-points of pallets 25, as indicated in Fig. 12, and it is also advantageous to locate cross pins 34 at about the rear quarter-points.

Figure 4:
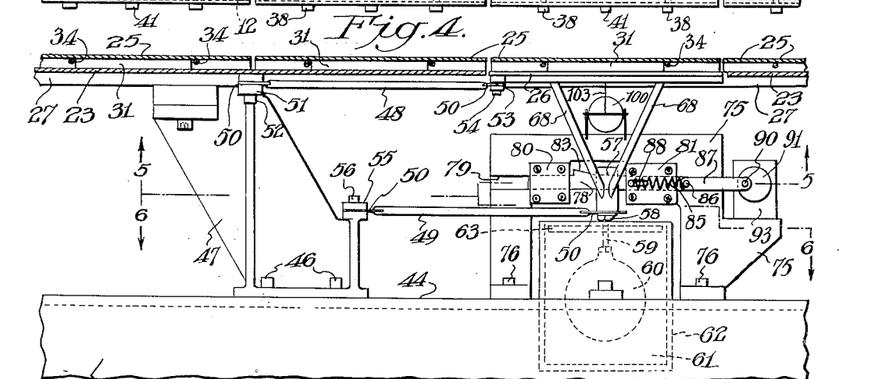
Fig. 4 is a side elevation view of a weighing platform with the conveyor bed shown in partial section.
Figure 5:
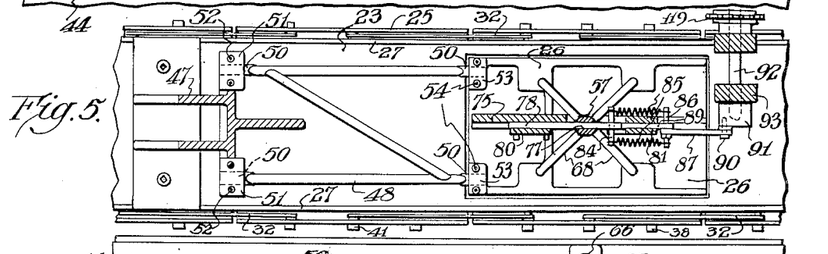
Fig. 5 is a sectional view taken along line 5—5 of Fig. 4.
Figure 6:
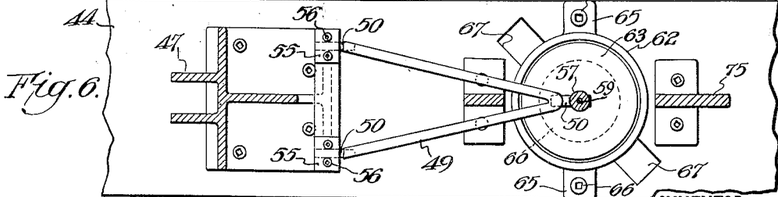
Fig. 6 is a sectional view taken along line 6—6 of Fig. 4.
Figures 9, 10:
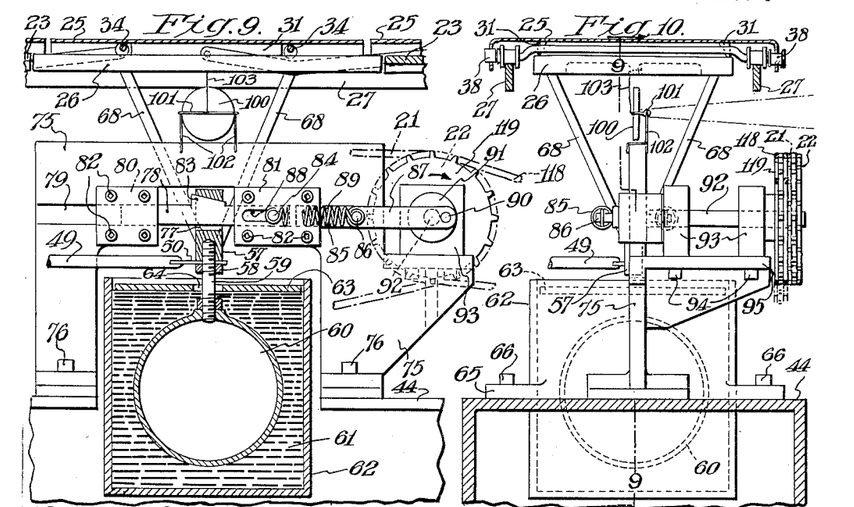
Fig. 9 is a sectional view taken along line 9—9 of Fig. 10.
Fig. 10 is a sectional view taken along line 10—10 of Fig. 2.

A preferred embodiment of weight comparison device according to this invention comprises weighing platform 26 and its deflecting support structure, including the float and flexural pivot combination detailed in Figs. 4-6 inclusive, and the locking and unlocking mechanism particularly shown in Figs. 9 and 10. Table 23 is cut away to accommodate platform 26, the top surface of which, in locked position, is at the same elevation as the top of the table, except for the slight clearance provided for free vertical movement of 26 with respect to 23. Locking at the position where platform 26 is normally at rest when no load is applied thereto is especially desirable in high speed weighing, because the lock serves as a steady rest which prevents the imposition of interfering forces at the instant of unlock manifested as vibrations.

The entire weighing assembly is supported by a sub-frame 44 secured to frame 11 by bolts 45. Mounted on sub-frame 44, by bolts 46, is a bracket 47 to which are attached the flexural pivot frames fully shown in Figs. 4-6. The upper frame 48 is preferably an N-truss consisting of three hollow tubular members, the cross member of which is securely soldered or brazed to the two side members. The lower frame 49 may have the form of a V-truss, consisting of a pair of hollow tubular members soldered or brazed together at the ends adjacent the weighing platform. In a typical case these frames were fabricated from 0.1875" O. D. x 0.1520" I. D. cold drawn seamless steel tubing.

The flexural pivot elements 50 comprise short lengths of flat spring steel stock which, for the specific apparatus hereinabove described, consisted of pieces .004" thick, 3/8" wide and 1 1/8" long. Elements 50 are securely attached to the tubular ends of frames 48 and 49 by crimping the tubes flat around these elements and then completing the bond by sweat soldering. The outer ends of the elements 50 of upper frame 48 are clamped to the upper flanges of bracket 47 by metal straps 51 secured by bolts 52, and to the underside of platform 26 by metal straps 53 secured by bolts 54. Similarly, the outer ends of the elements 50 of lower frame 49 are clamped to the lower flanges of bracket 47 by metal straps 55 secured by bolts 56, and to the lower end of hub 57 by nut 58, which is threaded on bolt 59 passed through a hole drilled through the central portion of this particular flexural pivot element.

It will be understood that the function of the flexural pivot elements 50 is to preserve the fixed location of weighing platform 26 with reference to table 23, while at the same time impeding the vertical displacement of platform 26 to a minimum degree. The weight of platform 26 and its supports hereinafter described, as well as the weight of any load applied to 26, is substantially entirely supported by float 60 immersed in liquid 61 contained in cup 62.

Referring to Figs. 4 and 5, platform 26 is supported by four struts 68, which are preferably fabricated from tubular stock of the same size as the members making up frames 48 and 49, in order to reduce weight. For the same reason the underside of 26 is recessed to provide a rigid construction while eliminating excess weight. All connections of struts 68 with hub 57 and with platform 26 are desirably by silver soldering or brazing.

The lower end of hub 57 is tapped to receive bolt 59 which secures float 60 in operative relationship to platform 26. Float 60 is spherical in shape and is dimensioned so that its limited displacement in the particular liquid 61 utilized will be sufficient to permit a comparison of the acceleration of a standard weight, plus the tare weight consisting of 26 and its supports, with the article whose status is to be determined, plus the same tare weight. In a typical installation designed for the weight classification of packages in the three pound range, a steel sphere having a wall thickness of approximately .020" and a diameter of 2 1/2" was entirely satisfactory where mercury was employed as the liquid 61. In this instance surface disturbance, occasioned by the rapid cyclical operation of the device, was eliminated and the entrance of foreign materials prevented by floating an iron annular ring 63 on the surface of the liquid, the central hole 64 therein being sufficiently large to permit unhampered movement of bolt 59.

Float cup 62 is provided with oppositely disposed flanges 65 (refer Figs. 6 and 10) which are drilled to receive sockethead bolts 66 threadedly engaged with tapped holes in sub-frame 44, to secure the cup in fixed position with respect to the other elements of the weighing assembly. Slots 67 are cut in sub-frame 44 to permit lowering cup 62 away from the platform supporting structure when repairs and maintenance require.

The locking and unlocking mechanism for the coordination of weighing platform operation with the translation of articles to be classified is shown in Figs. 2, 4, 5, 9 and 10, the entire assembly being mounted on yoke 75 attached to sub-frame 44 by bolts 76. The horizontal cross member of 75 is disposed in the central plane of the quadripod formed by struts 66, with the lower edge sufficiently above the top of hub 57 to permit free vertical movement of the weighing assembly when unlocked. Hub 57 is provided with a centrally disposed through-going opening 77 adapted to receive reciprocatory locking bar 78, which performs the cyclical locking and unlocking as hereinafter described in detail.

Locking bar 78 is slidably mounted in a milled way 79 in the front face of yoke 75 (refer Fig. 9) and is retained in position by cover plates 80 and 81 secured to 75 by bolts 82. The locking bar itself is generally rectangular in shape, except that it is provided along the upper edge with an inclined abutting projection 83 which mates with a similar inclined surface constituting the top of opening 77. The end of 78 adjacent the reciprocatory power source is provided with power-transmitting pin 84, both ends of which also are points of attachment for tension springs 85 (refer Figs. 5 and 9). The opposite ends of springs 85 are secured to the ends of pin 86 carried by connecting rod 87. Cover plate 81 is slotted at 88, permitting free reciprocation of pin 84 therein. Drive bar 89, secured to pin 86 and guided within way 79, accomplishes the unlocking by abutment on the adjacent end of locking bar 78, while springs 85 accomplish the locking with a limited application of force calculated to obviate jamming of the mechanism.

Connecting rod 87 is secured to drive pin 90 eccentrically mounted on drive wheel 91 fixedly attached to stub shaft 92 powered by sprocket 22 and drive chain 21. Stub shaft 92 is journaled in bearings 93 retained by bolts 94 engaging with tapped holes in outboard flange 95 of yoke 75.

Light-reflecting mirror 100, constituting one element of the rate of acceleration detection system, is provided with a fixed axle element 101 which is rotatably journaled in bearing posts 102 supported by yoke 75. Since axle 101 of mirror 100 is offset from the axis of rotation defined by bearing posts 102, the mirror will tend to turn about the plane including posts 102; however, restraining means in the form of flexible thread 103, attached at one end to the underside of weighing platform 26 and at the other to the mid-point of 101, prevents such movement unless 26 is moved downward from its position parallel to table 23. The extent of rotation of mirror 100 affords an index of rate of acceleration, permitting weight classification according to this invention.

Referring to Figs. 1 and 10 particularly, the rate of acceleration of platform 26 and its load is conveniently sensed by the vertical deflection of a beam of light reflected from mirror 100. Using this system, light source 109, which may be an ordinary 50 c. p. automobile headlight bulb powered by the usual battery source, is disposed at an angle about 15° from a normal to the mirror's reflective surface. The light reflected from mirror 100 is passed through a collimating lens 104 and impressed on an enclosed phototube 105, which may be of the R. C. A. 925 type, powered by voltage source 106. The electrical circuit constituting voltage source 106, phototube 105 and electrical conductors 107 actuates memory device 108, through a built-in electrical relay, to reject articles according to their classification as underweight, overweight or acceptable, all in a manner hereinafter more fully described.

This invention is preferably employed in conjunction with an automatic reject system, which separates specification articles from those not meeting specifications; however, it will be understood that the rate of acceleration detection mechanism hereinabove described may be utilized to merely identify one class of articles so that the articles may be segregated manually in accordance with their classifications. Thus, conventional marking devices actuated by the detection apparatus may be used to deposit a mark of distinctive color on non-specification articles, the entire output then going to a temporary storage area where the separation may be made by the plant personnel. Where manufacturing speeds are somewhat lower than 300 units per minute, this method is entirely practicable.

Referring specifically to operation with automatic rejection, it will be understood that the travel of chains 12 is co-ordinated with the operation of platform 26 and its appurtenances by the sprocket-chain drive so that, during the brief time interval that 26 is unlocked, only one article will have its weight applied to 26. As indicated in Fig. 9 particularly, the length of the pallet-supporting shoes 31 may conveniently be half the length of platform 26 so that, in a complete cycle of the locking-unlocking mechanism, or for each revolution of drive wheel 91, the equivalent of one pallet will always rest on platform 26. During the first 25% and the last 25% of each cycle the preceding pallet will be in the process of leaving 26 while the succeeding pallet will be entering upon 26 and, for these portions of the cycle, the weighing platform remains locked against vertical movement. During the mid 50% of the cycle the weighing platform is unlocked, and it is during this interval that the weight classification of each article is effected while the article is being translated at substantially uniform velocity thereacross.

As hereinbefore described, the entire weight of the article, the pallet supporting the article, and the weighing platform and its appurtenances is applied to float 60 immersed in liquid 61. The dimensions of float 60 are preferably proportioned so that, with a single pallet and a representative container filled with the exact weight of product which it is desired to maintain, float 60 will descend about 0.005″–0.008″ in liquid 61 during the unlocked interval of the weighing cycle. It will be apparent that precise proportioning of float 60 is not necessary to obtain this degree of platform deflection, since slug pieces of suitable weight may be readily affixed upon the underside of 26 to adjust the rate of descent to the desired amount. In the interests of simplicity of construction it is preferred to locate phototube 105 an appreciable distance (e. g. 10 or 12 ft.) away from mirror 100, so that the vertical sweep of the reflected light beam will be correspondingly expanded; however, if space is limited, the same result can be obtained by a multiple mirror reflection system, or in other ways well known to those skilled in the art.

Since under-weight filling is a condition to be especially safeguarded against in manufacturing, operation of this device to reject under-weight articles will be described in detail, it being understood that the invention is equally applicable to over-weight rejection, or to both under-weight and over-weight rejection by obvious modifications.

Figure 2:
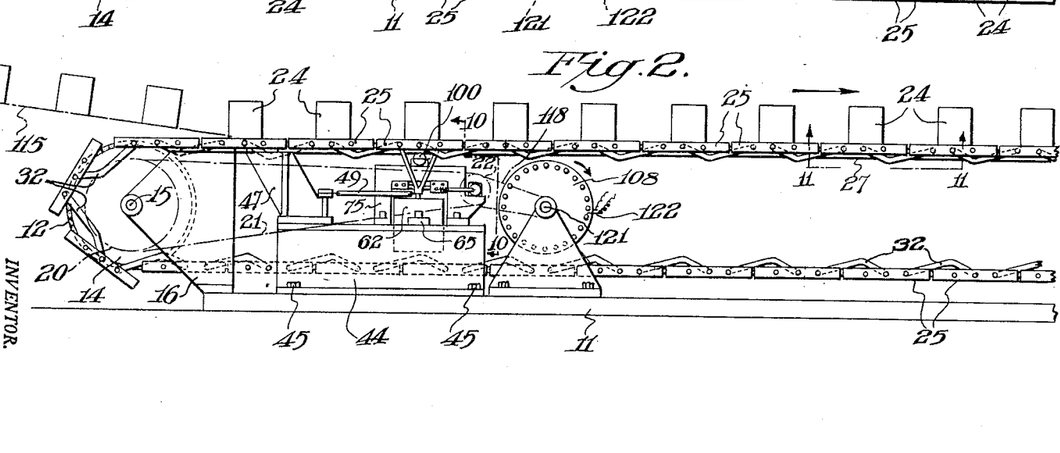
Figure 3:
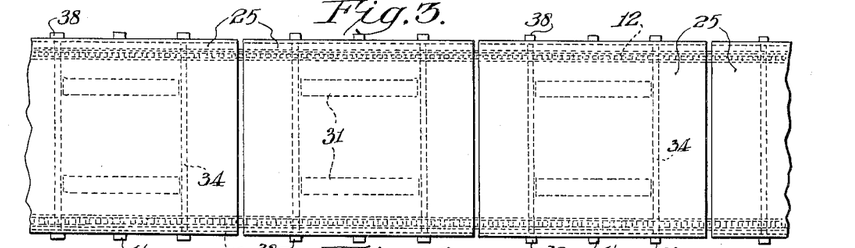

Referring to Figs. 1 and 2, the articles to be classified are supplied, one to each pallet, by a conventional conveyor, indicated schematically at 115, the discharge of which is co-ordinated with the travel of chains 12. As hereinbefore described, each article in sequence is continuously translated across weighing platform 26 where, during the unlocked portion of the cycle, its rate of downward acceleration is sensed by the upward deflection of the reflected light from mirror 100. Phototube 105 is mounted at such a height that only when each article accelerates to the point where the light beam impinges on 105 will the reject mechanism be actuated to non-rejecting position. Under these conditions it will be understood that under-weight articles will be rejected, while articles which meet or exceed the prescribed weight will pass through as acceptable.

The rejection operation is performed by the overhead reject apparatus indicated generally at 116, Figs. 1a and 2a, which intersects the line of travel of chains 12 at an acute angle, so that more time is afforded for the removal of non-acceptable articles 24 from pallets 25. As shown, apparatus 116 preferably comprises an endless traveling chain, only the lower run of which is depicted in the drawings for the sake of simplicity, which is provided with a number of pivoted reject arms 117 located at regular intervals therealong so that one will pass across the line of travel of each pallet in turn after the pallets have passed platform 26.

Since rejection is performed at a relatively considerable interval after classification by the deflection of 26, the operation of reject arms 117 must be delayed accordingly, so that rejection will not occur until the specific non-acceptable article arrives in the region where the line of travel of apparatus 116 intersects the line of travel of chains 12. If operation is such that each pallet 25 will always be provided with an article 24, the coordination of operation of 116 with chains 12 may be effected by incorporating a predetermined time delay in the actuation of 116. However, it is preferred to forestall spurious rejection due to the occasional absence of an article from a pallet by utilizing a memory apparatus such as 108.

The memory apparatus 108 shown in Figs. 1 and 2 comprises a conventional rotating wheel device provided with a multiplicity of deflectible pins of sufficient number such that the one corresponding to a particular article will remain depressed from the time of classification to the time of rejection before it is reset by a cam integral with the apparatus. This type of device is described in detail in U. S. Patent 2,217,342 and Pratt & Whitney Co. 3-49-4B Circular No. 518 and therefore is not further detailed here. It will be understood that the rotation of the wheel of memory device 108 must be synchronized with the travel of chains 12, and this can be conveniently achieved by driving the wheel with chain 118 (Figs. 1, 2 and 10) engaging with drive sprocket 119, keyed to shaft 92, and with driven sprocket 120 mounted on the rotatable shaft 121 upon which the memory wheel is fixed (refer Fig. 1).

In operation as hereinabove described, only articles having a weight in excess of a prescribed minimum will actuate phototube 105, whereupon an electrical signal will be impressed through conductors 107 on a solenoid or like device incorporated within memory device 108 only when the particular article being classified is acceptable. The corresponding pin of device 108 will then be deflected and, as the memory wheel rotates, the signal transmission will be correspondingly delayed until the particular article reaches the rejection region, when the specific pin will actuate cam switch 122 in the reject arm electrical circuit. For simplicity in representation, this electrical circuit comprises conductors 123 and power source 124 (Fig. 1), and reject arm-releasing solenoid 125 (Figs. 1a and 2a). Mechanical design considerations favor a construction of reject arm which is normally spring-biased to rejecting, or lowered, position by individual compression springs 126 by a stationary cam (not shown) in the path of travel of 116. Thus, unless solenoid 125 releases the reject arms to the upper position indicated by 117' in response to a signal that the particular article is acceptable, the particular article is automatically rejected (refer Figs. 1a and 2a).

Rejected articles, indicated at 24' in Figs. 1a and 2a, are deflected from pallets 25 by depending reject arms 117 and move laterally on to parallel reject conveyor belt 131, disposed closely adjacent chains 12 and on the same level as the top surfaces of the pallets during upper travel. When all rejected articles are delivered to reject conveyor 131, a conventional stationary cam (not shown) actuates all reject arms to the upper, non-engaging position indicated at 117'', so that further lateral movement of articles 24' is discontinued, and the rejected articles are carried by 131 to a separate segregation location for salvage or other disposition. Acceptable articles are removed from pallets 25 by stationary deflecting arm 132, located in a position clearing the top surfaces of the pallets, and pass over stationary bridge span 133 on to conveyor 134, which carries them to a boxing location or other destination.

If rejection due to over-weight filling solely is the desideratum, it will be apparent that the construction of reject apparatus 116 can be modified so that, in acceptance position, reject arms 117 will always be pivoted upwards and, at the same time, the location of phototube 105 with respect to mirror 100 can be altered so that only over-weight articles will actuate arms 117 to rejecting, or lower, position. Similarly, if under-weight and over-weight classification are desired simultaneously, a memory device 108 having two rows of pins may be employed together with two phototubes, the over-weight detecting one of which is located above the acceptable weight detecting one. The signals emanating from these two phototubes may be made to actuate reject arms 117 to reject both under and over-weight articles through the agency of means known to the art and therefore not further described herein. When such simultaneous classification is accomplished it will, of course, be understood that the number and arrangement of the reject conveyors may be varied widely to either segregate the rejects according to under or over-weight, or to lump both together simply as unacceptable items.

In a typical installation processing loaded cylindrical cans at a rate of 300/min., wherein the cans were slid across the weighing platform in direct contact therewith without the use of intermediately supporting pallets, the total weight of the weighing platform 20 and its appurtenances, including float 60, was 1090 gms. The weight of a representative can plus a standard weight of filling it was desired to maintain was 1523 gms., so that the total weight applied in a downward direction was 2613 gms. This weight was opposed at balance by an amount of displaced mercury equal to 2613 gms., making the total weight of the scale system 5226 gms. By actual test, it was determined that addition of 5 gms. weight to platform 20 elevated mirror 100 an amount insufficient to actuate phototube 105 to acceptance, while the addition of a total weight of 19 gms. invariably resulted in acceptance. Therefore, the average of 5 plus 19, or 12 gms., was calculated to be the limiting excess loading defining the threshold of the acceptance region. It is assumed that the difference between 12 and 5, or 7 gms., constituted the average inaccuracy equivalent loading due to frictional and vibrational interferences inherent in the particular device, which probably is a plus or minus quantity at any given instant during operation. The accuracy of classification obtained may be stated on the gross system basis as 19–5/2613, equal to approximately 0.5%, or on the net basis as 19–5/1523, equal to approximately 0.9%. In operation with this particular device over a relatively long period, check determinations revealed that net accuracy of classification of the order of about 1% was consistently obtained. Another device provided with pallets for the support of the cans achieved an even higher accuracy by eliminating the effects of can deformation.

From the foregoing it will be understood that the subject invention is capable of the continuous weight classification of a succession of articles moved along at relatively high speeds and, furthermore, that operation is entirely automatic. The limits of classification accuracy recited are sufficient for most industrial purposes; however, for special installations requiring higher accuracy it is possible to improve on the design by the application of known refinements in the art so that a considerable increase may be realized. In this connection, it will be understood that, as bolt 59 is progressively immersed deeper into liquid 61, a slight inaccuracy is introduced into the classification due to the difference in volume of liquid displaced from the at-rest position to the terminally immersed position. The amount of this error may be minimized by reducing the cross-sectional area of bolt 59 within the limits of strength requirements. Another refinement improving the accuracy includes the addition of shock-absorbing pads to all apparatus elements where vibrations are set up during operation.

While this invention has been described in detail in connection with the weight classification of articles in the range of 3 to 4 lbs. gross weight, it will be especially understood that the invention is equally applicable to the classification of articles of much greater or lesser weight, the apparatus being calibrated for each individual range in each specific instance. Where greater absolute weights are to be handled the physical dimensions of the apparatus elements will necessarily be enlarged whereas, for lower weight applications, these dimensions may be reduced. The type and arrangement of rate of acceleration sensing apparatus, and rejecting and reject removal auxiliary equipment may, of course, vary widely to suit particular requirements, as will be well understood by persons versed in electro-optical detection and conveying arts.

Furthermore, although this invention has been described with particular reference to a downwardly deflecting weighing platform, it is apparent that the relative positions of the apparatus elements may be reversed and the weighing platform calibrated so that weight comparison may be achieved on the up swing equally as well as on the down swing.

By the term "free translation," as employed in the claims, is meant motion in which all the points of the moving articles in process have at any instant substantially the same velocity and direction of motion, while at the same time the full weight of the articles is supported by the table or weighing platform directly or indirectly, as when pallets are used to effect the movement. It will be apparent that free translation of the articles is only necessary over the length of the weighing platform and a short distance preceding the platform, to minimize interfering vibrations, whereas the balance of travel may be by means supporting part or all of the weight of the articles in process.

Where the weight of the standard mass is equated against the counterforce of the weighing system in the claims, as by the terms "balanced," "counterbalanced," "equal" or other language, it is meant substantial equality of the order constituting about 0.1% tolerance plus or minus. In practice it is not difficult to obtain a balance of 1 gram plus or minus where the standard mass weight is 5000 grams, for a system wherein the deflection of the reflected light beam is about 24 inches.

From the foregoing, it will be clear that numerous modifications may be made without departing from the spirit of my invention and I do not intend to be limited except as pointed out in the claims which follow.

What is claimed is:

1. An apparatus for the classification of a plurality of articles according to weight while said articles are in free translation in a gasiform atmosphere at substantially constant velocity comprising means moving said articles at a substantially constant velocity horizontally, a gravity-deflectible total mass system having an article-receiving means with its mass opposed to a standard mass of known classification disposed substantially co-planar with the path of horizontal movement of the base portions of said articles, means for determining the gravitational rate of acceleration of said total mass system when each article individually is disposed on said article-receiving means and for deriving a signal which is a function of said gravitational rate of acceleration, means returning said article-receiving means to original position substantially co-planar with the path of horizontal movement of the base portions of said articles after determination of said rate of acceleration, and means segregating said articles in accordance with the individual signals corresponding to each of said articles.

2. An apparatus for the classification of a plurality of articles according to claim 1 wherein said total mass system comprises an article-receiving weighing platform supported by a float substantially entirely immersed in a liquid having a density sufficient so that the weight of the liquid displaced by said float is equal to the tare weight of said weighing platform plus the weight of said standard mass of known classification.

3. An apparatus for the classification of a plurality of articles according to weight while said articles are in free translation in a gasiform atmosphere at substantially constant velocity comprising traveling chain means moving said articles continuously at a substantially constant velocity horizontally, a smooth table means parallel and contiguous to said chain means contacting the base portions of said articles, a gravity-deflectible total mass system having an article-receiving means with its mass opposed to a standard mass of known classification disposed in prolongation and substantially co-planar with said table, means for determining the gravitational rate of acceleration of said total mass system when each article individually is disposed on said article-receiving means and for deriving a signal which is a function of said gravitational rate of acceleration, means co-ordinated with the travel of each of said articles across said article-receiving means to cyclically release said article-receiving means to permit free deflection thereof when each said article is impelled on to said article-receiving means and to cyclically lock said article-receiving means co-planar with said table means while one of said articles is impelled off and a succeeding one of said articles is impelled on to said article-receiving means, and means segregating said articles in accordance with the individual signal corresponding to each said article.

4. An apparatus for the classification of a plurality of articles according to claim 3 wherein said gravity-deflectible total mass system comprises an article-receiving weighing platform retained against longitudinal movement with respect to said table means by at least one flexural pivot element having an end fixedly attached to said weighing platform and the opposite end fixedly attached to a stationary support and connecting means on said weighing platform securing said weighing platform to a float substantially entirely immersed in a liquid having a density sufficient so that the weight of the liquid displaced by said float is equal to the tare weight of said weighing platform plus the weight of said standard mass of known classification.

5. An apparatus for the classification of a plurality of articles according to weight while said articles are in free translation in a gasiform atmosphere at substantially constant velocity comprising a pair of parallel endless roller chains, powered means driving said roller chains in unison in the same direction at substantially constant velocity, article-impelling cross pins connecting said roller chains together at equal intervals over the lengths, a frame guiding said roller chains along an upper horizontal course of travel and a lower return course of travel, a table parallel and contiguous to said upper course of travel of said roller chains contacting the base portions of said articles, said table being provided with an aperture at a point intermediate the ends of said upper course of chain travel for the reception of a weighing platform, a gravity-deflectible total mass system having a weighing platform with its mass opposed to a standard mass of known classification bridging said aperture with sufficient clearance between said table and said weighing platform to permit free vertical deflection of said weighing platform with respect to said table, means operating in coordination with the travel of each of said articles across said weighing platform to cyclically release said weighing platform to permit free deflection thereof when each said article is impelled on to said weighing platform and to cyclically lock said weighing platform at a level substantially co-planar with the top surface of said table while one of said articles is being impelled off said weighing platform and a succeeding one of said articles is being impelled on to said table, means for determining the gravitational rate of acceleration of said total mass system when each article individually is disposed on said weighing platform during the time interval in which said weighing platform is released and for deriving a signal which is a function of said gravitational rate of acceleration, and means segregating said articles in accordance with the individual signal corresponding to each said article.

6. An apparatus for the classification of a plurality of articles according to weight while said articles are in free translation in a gasiform atmosphere at substantially constant velocity comprising a pair of parallel endless roller chains, powered means driving said roller chains in unison in the same direction at substantially constant velocity, cross pins connecting said roller chains together at equal intervals over the lengths, individual substantially identical article-supporting pallet members attached to each of said cross pins and to succeeding pallets by loose connections permitting application of the full weight of each of said pallets to an underlying supporting surface, a frame guiding said roller chains along an upper horizontal course of travel and a lower return course of travel, a table parallel and contiguous to said upper course of travel of said roller chains supporting the full weights of said pallets and the articles carried by said pallets, said table being provided with an aperture at a point intermediate the ends of said upper course of chain travel for the reception of a weighing platform, a gravity-deflectible total mass system having a weighing platform with its mass opposed to a standard mass of known classification plus the mass of one of said pallets bridging said aperture with sufficient clearance between said table and said weighing platform to permit free vertical deflection of said weighing platform with respect to said table, means operating in co-ordination with the travel of each of said pallets across said weighing platform to cyclically release said weighing platform to permit free deflection thereof when each said pallet is impelled on to said weighing platform and to cyclically lock said weighing platform at a level substantially co-planar with the top surface of said table while one of said pallets is being impelled off said weighing platform and a succeeding one of said pallets is being impelled on to said table, means for determining the gravitational rate of acceleration of said total mass system when each said article-supporting pallet member individually is disposed on said weighing platform during the time interval in which said weighing platform is released and for deriving a signal which is a function of said gravitational rate of acceleration, and means segregating said articles in accordance with the individual signal corresponding to each said article.

7. An apparatus for the classification of a plurality of articles according to claim 6 wherein said gravity-deflectible total mass system comprises a plane-surfaced weighing platform, vertical supporting means including a float substantially entirely immersed in a liquid having a density sufficient so that the weight of the liquid displaced by said float is equal to the combination of the tare weight of said weighing platform, the weight of any elements depending therefrom, the weight of one of said pallets and the weight of said standard mass of known classification, connecting means depending from said weighing platform for attachment of said weighing platform to said float, and lateral retaining means for said weighing platform including a plurality of flexural pivot elements fixedly attached to said weighing platform and to a stationary support.

8. An apparatus for the classification of a plurality of articles according to claim 6 wherein said means for determining the gravitational rate of acceleration of the total mass system during the time interval in which said weighing platform is released and for indicating said rate of acceleration comprises a light-reflecting mirror deflectible through a distance proportional to the deflection of said weighing platform, a stationary light source directing light at said mirror, and at least one light-sensitive element responsive to reflected light from said mirror disposed at a position corresponding to the finite mirror-light displacement for a mass within a limiting known classification, and means responsive to said light-sensitive element for actuating said means segregating said articles in accordance with the individual signal corresponding to each said article.

9. An apparatus for the classification of plurality of articles according to claim 6 wherein said means for determining the gravitational rate of acceleration of the total mass system during the time interval in which said weighing platform is released and for indicating said rate of acceleration comprises a light-reflecting mirror deflectible through a distance proportional to the deflection of said weighing platform, a stationary light source directing light at said mirror, and at least one light-sensitive element responsive to reflected light from said mirror disposed at a position corresponding to the finite mirror-light displacement for a mass within a limiting known classification, and means including a memory device responsive to said light-sensitive element actuating said means segregating said articles in accordance with the individual signal corresponding to each said article.

10. An apparatus for the classification of a plurality of articles according to weight while said articles are in free translation in a gasiform atmosphere at substantially constant velocity comprising a pair of parallel endless roller chains, powered means driving said roller chains in unison in the same direction at substantially constant velocity, cross pins connecting said roller chains together at equal intervals over the lengths, individual substantially identical article-supporting pallet members attached to each of said cross pins and to succeeding pallets by loose connections permitting application of the full weight of each of said pallets to an underlying supporting surface, a frame guiding said roller chains along an upper horizontal course of travel and a lower return course of travel, a table parallel and contiguous to said upper course of travel of said roller chains supporting the full weights of said pallets and the articles carried by said pallets, said table being provided with an aperture at a point intermediate the ends of said upper course of chain travel for the reception of a weighing platform, said weighing platform comprising a plane-surfaced plate, vertical supporting means including a float substantially entirely immersed in a liquid having a density sufficient so that the weight of the liquid displaced by said float is equal to the combination of the tare weight of said weighing platform, the weight of any elements depending therefrom, the weight of one of said pallets and the weight of said standard mass of known classification, connecting means depending from said weighing platform for attachment of said weighing platform to said float, and lateral retaining means for said weighing platform including a plurality of flexural pivot elements fixedly attached to said weighing platform and to a stationary support, means operating in co-ordination with the travel of each of said pallets across said weighing platform to cyclically release said weighing platform to permit free deflection thereof when each said pallet is impelled on to said weighing platform and to cyclically lock said weighing platform at a level substantially co-planar with the top surface of said table while one of said pallets is being impelled off said weighing table and a succeeding one of said pallets is being impelled on to said table, a light-reflecting mirror journaled on a stationary support, connecting means between said weighing platform and said light-reflecting mirror causing proportional deflection of said mirror when said weighing platform is deflected, a stationary light source directing light at said mirror, at least one phototube responsive to reflected light from said mirror disposed at a position corresponding to the finite mirror-light displacement for a mass within a limiting known classification, means including a memory device responsive to said phototube, and means responsive to said memory device for segregating said articles in accordance with the light displacement corresponding to each said article comprising at least one article-displacing means disposed superjacent said roller chains, said last-mentioned means being provided with article-displacing elements actuated to article-displacing position by an appropriate signal emanating from said memory device and an article-receiving conveyor co-operating with each of said article-displacing means for the reception of articles displaced by said last-mentioned means.

NORVIN G. MALONEY.

References Cited in the file of this patent

UNITED STATES PATENTS

| Number | Name | Date |
| --- | --- | --- |
| 1,656,210 | Litchfield | Jan. 17, 1928 |
| 1,735,089 | Plummer | Nov. 12, 1929 |
| 2,067,744 | Williams | Jan. 12, 1937 |
| 2,112,823 | Breuilh | Apr. 5, 1938 |
| 2,305,020 | Mau | Dec. 15, 1942 |
| 2,307,695 | Mansbendel | Jan. 5, 1943 |
| 2,311,722 | Wyland | Feb. 23, 1943 |
| 2,489,899 | Kniazuk | Nov. 29, 1949 |